(12) United States Patent
Lee

(10) Patent No.: US 6,567,947 B1
(45) Date of Patent: May 20, 2003

(54) METHOD FOR CONTROLLING SYNCHRONIZATION OF A DIGITAL EUROPEAN CORDLESS TELEPHONE

(75) Inventor: Je-Kyoung Lee, Koyang (KR)

(73) Assignee: Samsung Electronics Co., LTD, Suwon (KR)

( * ) Notice: Subject to any disclaimer, the term of this patent is extended or adjusted under 35 U.S.C. 154(b) by 309 days.

(21) Appl. No.: 09/603,549

(22) Filed: Jun. 26, 2000

(30) Foreign Application Priority Data

Jun. 24, 1999 (KR) .......................................... 1999-23999

(51) Int. Cl.[7] ............................................... G06F 11/00
(52) U.S. Cl. ........................................ 714/746; 714/758
(58) Field of Search ................................. 714/746, 775, 714/758, 751, 798

(56) References Cited

U.S. PATENT DOCUMENTS

| | | | | |
|---|---|---|---|---|
| 5,208,812 A | * | 5/1993 | Dudek et al. | |
| 5,228,026 A | * | 7/1993 | Albrow et al. | |
| 5,416,779 A | * | 5/1995 | Barnes et al. | |
| 5,754,956 A | * | 5/1998 | Abreu et al. | |
| 6,226,515 B1 | * | 5/2002 | Pauli et al. | |

* cited by examiner

*Primary Examiner*—Phung M. Chung
(74) *Attorney, Agent, or Firm*—Cha & Reiter

(57) ABSTRACT

A method for controlling the synchronization of a digital European cordless telephone (DECT) having a base unit capable of registering a plurality of handset units, comprises the steps of: sending a new dummy bearer information from the base unit to a handset unit; storing the received bearer information into a candidate buffer in the handset unit; changing the receiving position of the dummy information to the information stored in the candidate buffer if the cyclic redundancy checking (CRC) error occurs continuously over a predetermined number of times; and, retrieving the new bearer information stored in the candidate buffer.

15 Claims, 3 Drawing Sheets

METHOD FOR CONTROLLING SYNCHRONIZATION OF A DIGITAL EUROPEAN CORDLESS TELEPHONE

This application makes reference to, incorporates the same herein, and claims all benefits accruing under 35 U.S.C. Section 119 from an application for METHOD FOR CONTROLLING SYNCHRONIZATION OF A DIGITAL EUROPEAN CORDLESS TELEPHONE filed earlier in the Korean Industrial Property Office on Jun. 24, 1999 and there duly assigned Serial No. 23999/1999.

BACKGROUND OF THE INVENTION

1. Field of the Invention

The present invention relates to cordless telephones under the digital European cordless telephone (DECT) standard. More particularly, the present invention relates to a method for controlling the synchronization between a plurality of handset units and a base unit of the DECT standard in which each handset unit and the base unit are provided with different communication channel according to different manufacturers.

2. Description of the Related Art

Cordless telephone sets under the DECT (Digital European Cordless Telecommunication) Standard are known to have a base station that has both a normal telephone unit and an additional mobile unit. If the base station is integrated into a normal telephone unit or any additional mobile unit, a hand-free function can be achieved. A method for synchronizing a conventional DECT is characterized in that a dummy channel, which is predetermined by the manufacturer, is used to synchronize to a base station. However, the handset often loses synchronization with the base unit due to the interference caused by an additional handset integrated to the same base station. That is, the traffic channel of the additional handset, which is made by different manufacturer, is inadvertently allocated too close to or in the same channel range as the dummy channel assigned to the normal handset.

As an example, a base unit and a normal handset unit, which are manufactured by a German company, SIEMENS (trademark of Siemens Company), and an additional handset unit, which is made by a Korean company, SAMSUNG ELECTRONICS (trademark of Samsung Electronic Co., Ltd), can be integrated to the same base station. Each respective handset is pre-assigned with a dummy channel and a traffic channel at different frequency range according to their respective manufacturers. If the SAMSUNG handset is integrated to the base station and the SIEMENS handset attempts to establish a call set up, the SIEMENS hand set will be unable to establish a call set up using the original dummy channel assigned thereto. This problem occurs as the traffic channel assigned by the SAMSUNG handset is interfering with the dummy channel assigned between the handset and the base station made by the SIEMENS. Thus, the presence of SAMSUNG handset integrated to the same base station will interfere with the dummy channel, which is pre-assigned to the SIEMENS handset, when attempting a call set up. In such scenario, the SIEMENDS handset will keep on looking for the dummy channel, causing an increase in the power consumption. Currently, the prior art system does not address the above problem, thus the handset would be unable to synchronize to the base station timing due to the interference caused by the additional handset.

SUMMARY OF THE INVENTION

It is an object of the present invention to provide a method for controlling the synchronization of a DECT (digital European cordless telephone) in order to maintain the synchronization between additional handsets and a base unit made by different manufacturers.

It is another object of the present invention to provide a method for controlling the synchronization of a digital European cordless telephone (DECT) in order to prevent the unnecessary power consumption by the handset in an attempt to synchronize to the base unit timing.

According to an aspect of the present invention, a method for controlling the synchronization of additional digital European cordless telephones (DECTs) to a base unit includes the steps of: transmitting a new bearer information through a dummy bearer channel from the base unit to the handset unit if an additional handset is integrated to the same base unit, causing an interference with the dummy channel of the handset unit; storing the received bearer information into a candidate buffer of the handset unit; changing, by the handset, the receiving position of the dummy information to the information stored in the candidate buffer in the event that the cyclic redundancy checking (CRC) error exceeds a predetermined number of times; and, retrieving the new bearer information from the candidate buffer.

According to another aspect of the present invention, a method for controlling the synchronization of additional digital European cordless telephones (DECTs) to a base unit includes the steps of: synchronizing the base unit to a handset via a dummy channel; transmitting a new dummy bearer channel information from the base unit to a handset if a traffic channel is established between the base unit and an additional handset; storing the new bearer channel information into a candidate buffer of the handset; determining whether the dummy channel and the traffic channel coexists more than a predetermined time period; assigning a new dummy channel using the new dummy bearer channel information transmitted from the base unit if the dummy channel and the traffic channel coexists more than the predetermined time period; determining whether cyclic redundancy checking (CRC) errors of the dummy channel occurs more than a predefined number of times if the dummy channel and the traffic channel coexist less than the predetermined time period; and, assigning a new dummy channel using the new dummy bearer channel information transmitted from the base station if said CRC errors exceed the predefined number of times.

According to one aspect of the present invention, the method further includes the step of transmitting signal packet, which includes error detection information for detecting corrupt signals, as set forth under the DECT standard.

According to another aspect of the present invention, the method further includes the step of storing a plurality of different dummy channels in the base unit, wherein the dummy channels are used to synchronize with the base unit.

The present invention will now be described more specifically with reference to the drawings attached only by way of example.

BRIEF DESCRIPTION OF THE ATTACHED DRAWINGS

A more complete understanding of the method of the present invention may be illustrated according to the following detailed description when taken in conjunction with the accompanying drawings wherein.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
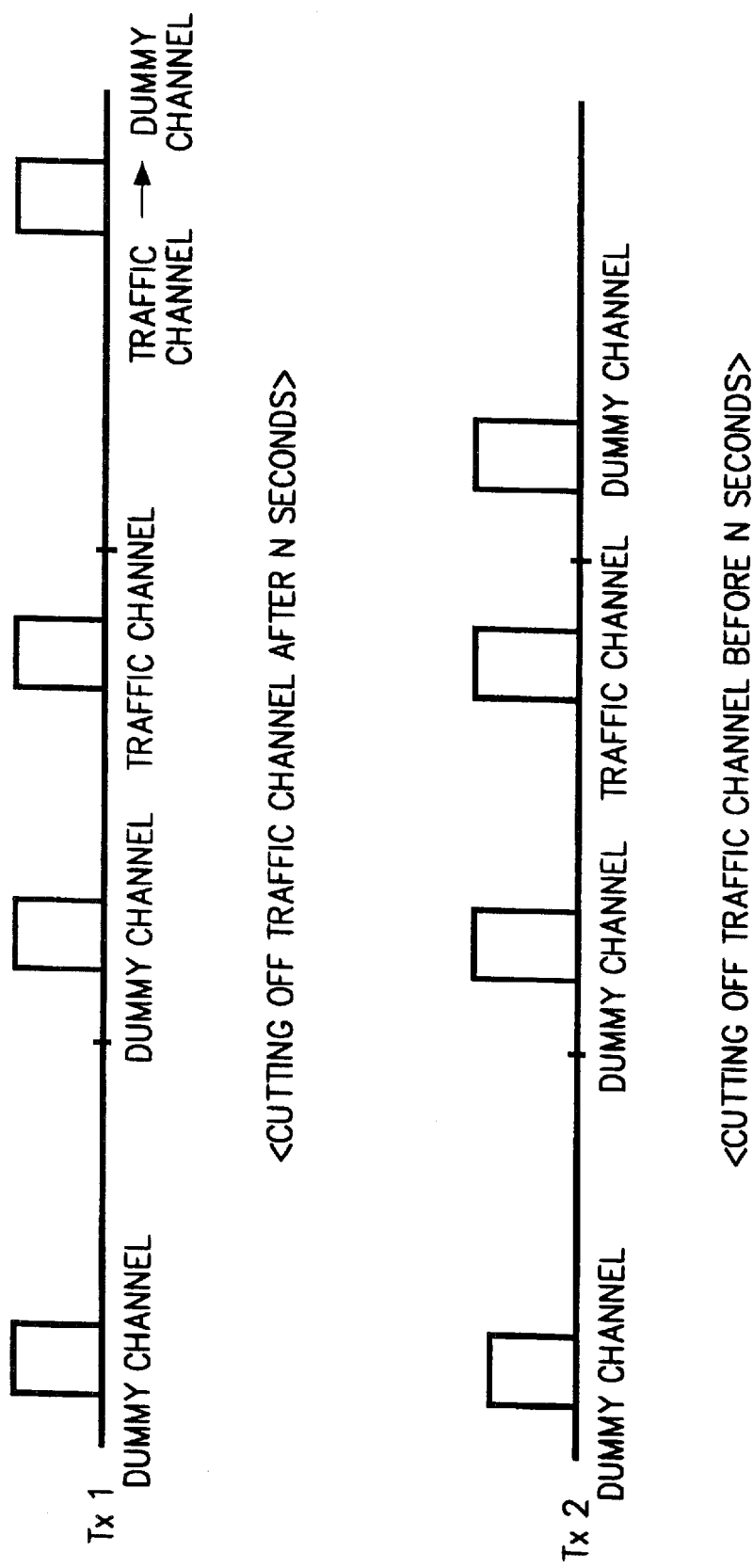
FIG. 1 is a schematic diagram for illustrating different states in synchronizing the handset to the base station according to the present invention.

FIG. 1 illustrate two states in which synchronization is established between the handset unit and the base unit according to the present invention. In state Tx1, the bearer information, which includes channel state information, clock information for synchronization, pilot information that are used to specify a communication channel to exchange information between the base station and the handset, is transmitted from the base unit to a handset unit via the dummy channel. In this case, the handset scans the base unit for a control channel (or dummy bearer channel) to synchronize to the base station timing for a call set up. Accordingly, when a normal handset is in communication with the base station and if an additional handset is integrated to the same base station, the dummy channel between the normal handset and the base station, and the traffic channel established between the additional handset and the base station will coexist for the duration of N seconds. It is within this predetermined duration of N seconds where the channel interference occurs due to the integration of an additional handset with the same base station. At this time, the base station recognizing such interference transmits a new dummy channel information to all handsets to be stored in the buffer thereto. If the communication between the base station and the additional handset continues beyond the predetermined N seconds, the traffic channel receives the new dummy channel information from the handset buffer and converts the traffic channel into a new dummy channel when the traffic channel is terminated. Thereafter, the new dummy channel which can over come the interference caused by the additional handset is obtained to synchronize to the base station timing.

Alternatively, in state Tx2, the base unit transmits the new bearer information through the dummy channel to all handset units. Then, the dummy and the traffic channels, as explain above, coexist for the duration of N seconds. In this state, the base station transmits the new dummy channel information to all handsets integrated thereto. However, if the traffic channel between the base station and the additional handset is terminated is before the expiration of the predetermined N seconds, the dummy channel is not replaced with the new dummy channel since the interference caused by the additional handset is eliminated within the predetermined N seconds.

Hereinafter, a description of the inventive method for continuously maintaining the synchronization between additional handsets made by different manufacturer and the base station is explain in connection with FIGS. 2 and 3.

According to the embodiment of the present invention, a base station is provided with a plurality of predetermined dummy channels so that if any one of the plurality of handsets connected to the base station has to search for different dummy channel due to the interference caused by the introduction of additional handset, the base station transmits an alternate dummy channel that is free of interference so that the handset can synchronize to the base station via the alternate dummy channel.

Briefly, in a cordless telephone system, a specific range of frequencies assigned to each system and a cordless telephone set within the system can only communicate with a base station in the same system utilizing the same specified range of frequencies. Thus, as understood by those skilled in the art, the same range of frequencies must be assigned to and used by a multiple cordless telephone system. To accomplish the multiple radio access and transmission between a base station and a plurality of telephone sets, including the normal and the additional telephone sets, must use a TDMA/FDMA architecture, wherein each frame is divided into 8 time slots and a certain number of slots are assigned to respective downlink or uplink channels. For instance, one slot of each 4 slots may be used as a slot (control channel) for setting function channels for transmitting control information and other slots (communication/traffic channel) can be used for communication. Thus, the handset monitors signals transmitted by a base station to receive system information in a well-known manner. Moreover, a signal packet is transmitted each frame on active and dummy channels, and it is well known in those in this art that the signal packet is divided into different fields. One of the field has its own error detection sub-fields known as Cyclic Redundancy Checks (CRCs).

Figure 2:
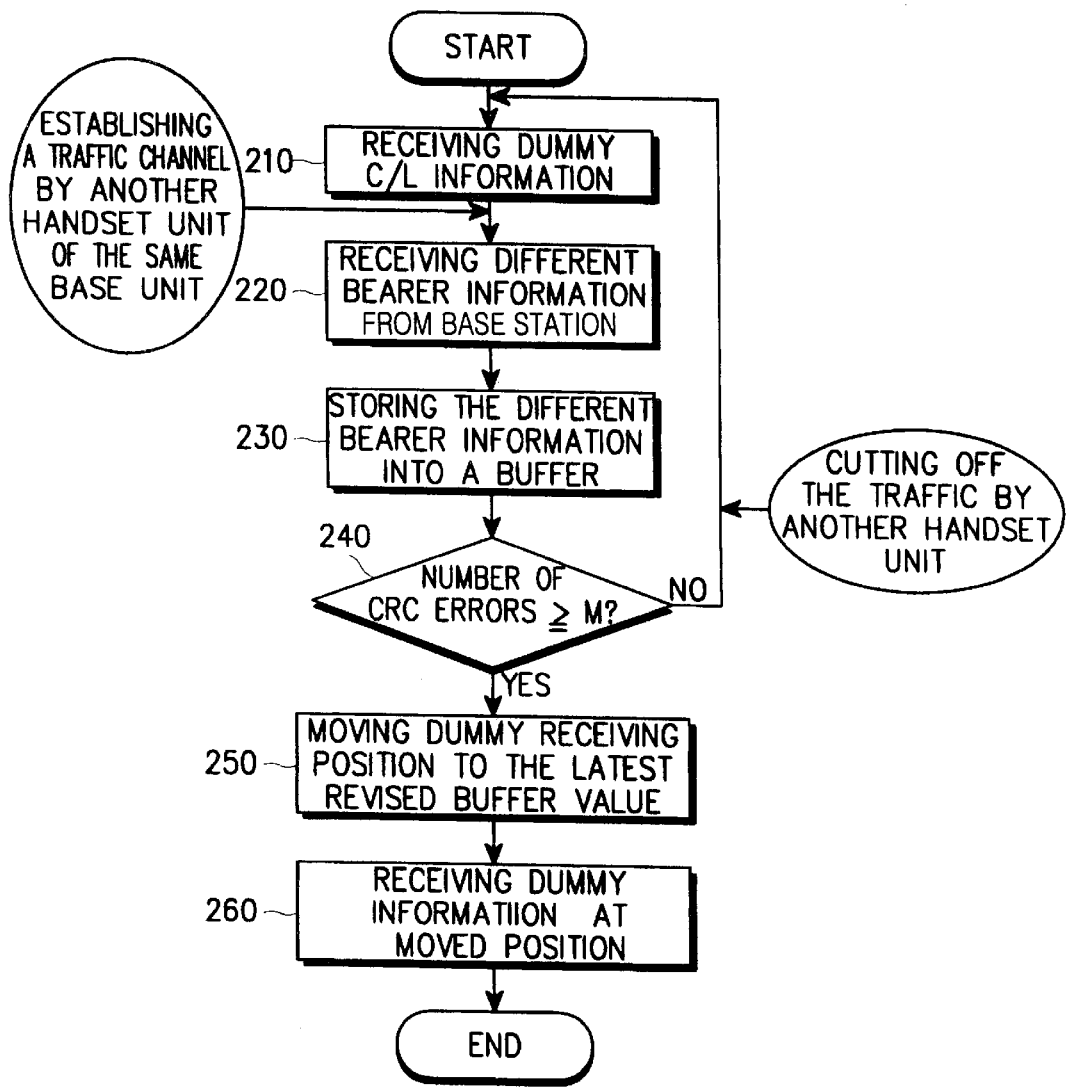
FIG. 2 is a flow chart for illustrating the process of controlling the synchronization of a DECT (digital European cordless telephone) according to a first preferred embodiment of the present invention; and, FIG. 3 is a flow chart for illustrating the process of controlling the synchronization of a DECT according to a second preferred embodiment of the present invention.

According to one embodiment of the present invention as shown in FIG. 2, a first handset unit receives the dummy channel information from a base unit in step 210. At this time, if an additional handset unit linked to the same base unit establishes a traffic channel causing an interference to the dummy channel assigned to the first handset, the first handset receives a new bearer information indicating a new dummy channel from the base station in step 220. Then, the new bearer information is stored into a candidate buffer of the first handset unit in step 230, thus the first handset is updated with the latest bearer information that can overcome the interference.

In step 240, it is determined whether the detected CRC error is equal to or greater than a predetermined number of times M. If there were no CRC error greater than the predetermined M times in step 240, which indicates that the traffic channel of the additional handset is terminated prior to inducing enough interference to the dummy channel of the first handset to lose the synchronization to the base station timing, the process returns to step 210.

However, if the detected CRC error is equal to or greater than the predetermined M times in step 240, the handset unit moves its dummy receiving position to the latest revised buffer value so that the newly received dummy channel information can be retrieved. Accordingly, the dummy receiving position is revised to the new bearer information, which was previously revised in step 230, so that the first handset can be synchronized to the base station through the new dummy bearer channel. Accordingly, the first handset unit retrieves the newly received dummy information in step 260 so that the synchronization with the base unit can be achieved even when the additional handset establishes a traffic channel which interferes with the dummy channel assigned to the first handset.

Figure 3:
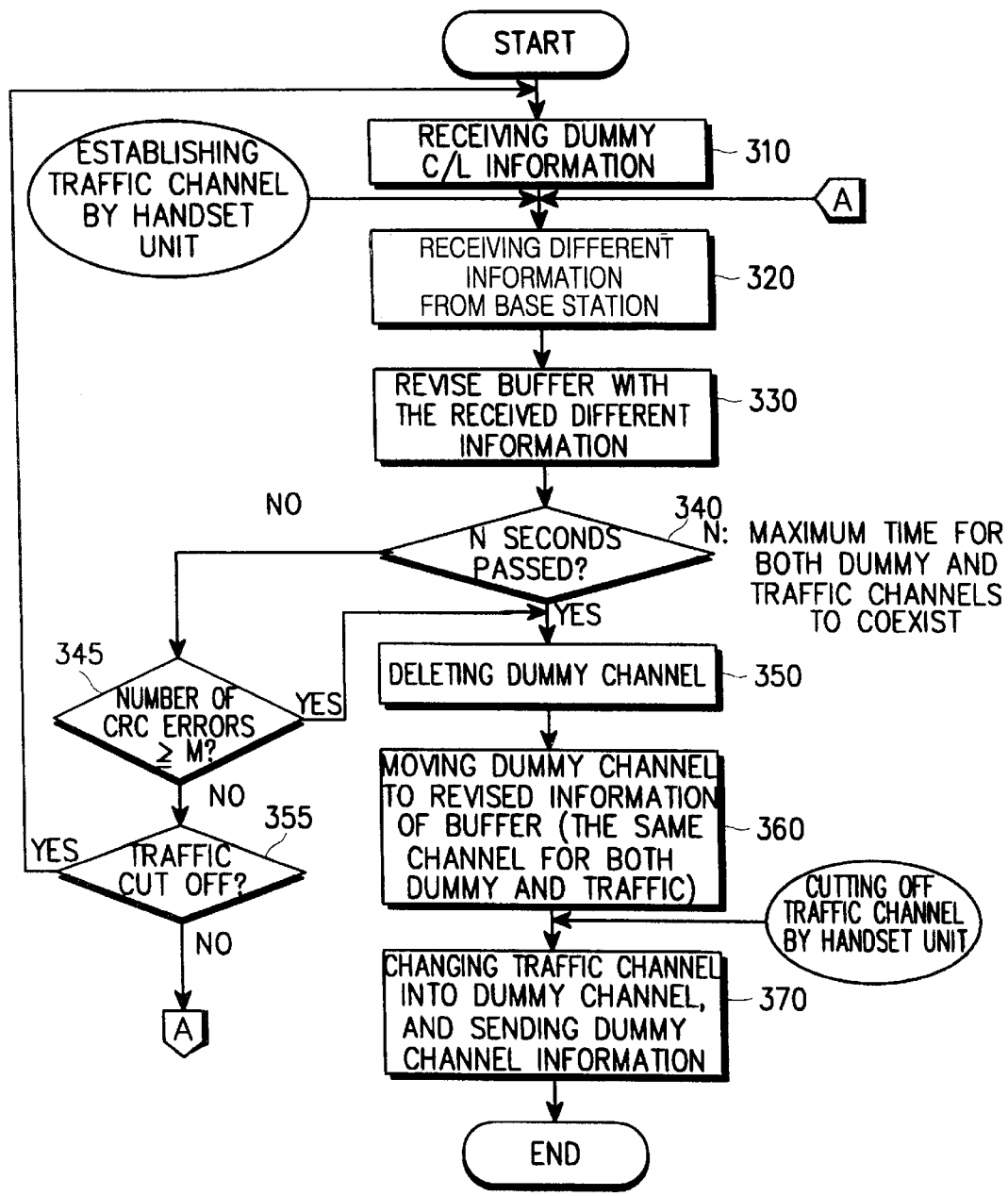

Another embodiment of the present invention is illustrated in FIG. 3. With reference to FIG. 3, the process of controlling synchronization is characterized in that a predetermined time period is introduced to determine whether to assign a new dummy channel based on whether the additional handset cuts off the traffic channel with the base station within a predetermined period. In step 310, a first handset unit receives a new dummy channel information from the base station. That is, when an additional handset is integrated to the same base station causing an interference to the dummy channel of the first handset, the first handset receives new bearer information from the base station, in step 320, and the received new bearer information is revised in the candidate buffer of the first handset, in step 330. Then, it is determined, in step 340, whether the duration of both the dummy channel of the first handset and the traffic channel of the additional handset exceeds a predetermined time N seconds. If the duration of traffic channel of the additional handset exceeds the predetermined time N seconds in step 340, the previous dummy channel of the first handset is deleted, in step 350, and the receiving position of the first handset moves to the revised information of the buffer where the new dummy channel information is stored. Then, the traffic channel retrieves the new dummy bearer channel information. The base station changes the traffic channel into a new dummy channel, in step 370, if the additional handset unit cuts off the traffic channel, and thereafter the base station sends the dummy bearer channel information through the new dummy channel.

Alternatively, if the interference caused by the traffic channel of the additional handset does not exceed the predetermined N seconds in step 340, it is determined, in step 345, whether the CRC error exceeds a predetermined number of times M is detected. This is done to check whether the handset unit is normally receiving the dummy information from the base unit. If the number of detected CRC errors is equal to or greater than M, the process returns to the step 350, and the subsequent steps are performed as described in the above paragraph. However, if the detected error is less than the predetermined M times in step 345, it is determined, in step 355, whether the traffic channel of the additional handset is cut off. If so, the process returns to the step 310. Otherwise, the process returns to the step 320.

As described above, the inventive method meets the recommended specification of the DECT standard in that an additional handset can be integrated to a base station without losing synchronization to the same base station by the normal handset. Also, the inventive method is able to reduce the power consumption associated with the prior art handset which is required to search for a new dummy channel.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for controlling the synchronization of a digital European cordless telephone (DECT) having a base station capable of registering a plurality of handset units, comprising the steps of:

(a) transmitting a dummy bearer channel information from said base station to a handset if a traffic channel is established between said base station and an additional handset;

(b) storing said received bearer channel information into a candidate buffer of said handset;

(c) changing the receiving position of said handset unit to said candidate buffer where said received bearer channel information is stored, if cyclic redundancy checking (CRC) errors exceed a predetermined number of times; and, (d) retrieving, by said handset, said dummy bearer channel information stored in said candidate buffer in order to assign a new dummy channel to be used to synchronize to said base station.

2. The method as recited in claim 1, wherein said method further comprising the step of transmitting signal packet, which includes error detection information for detecting corrupt signals, as set forth under a digital European cordless telephone (DECT) standard.

3. The method as recited in claim 1, wherein said method further comprising the step of storing a plurality of different dummy channels in said base station, said different dummy channels are used to synchronize to said base station.

4. The method as recited in claim 1, wherein said CRC errors exceed said predetermined times when an additional handset establishes a traffic channel with said base station.

5. The method as recited in claim 4, wherein said CRC errors do not exceed said predetermined times when said additional handset terminates said traffic channel in communication with said base station.

6. The method as recited in claim 1, wherein said step (a) of transmitting said dummy bear channel is repeated if said CRC errors do not exceed said predetermined number of times.

7. The method as recited in claim 1, wherein said step (b) of storing said received bearer channel information is performed when said additional handset establishes said traffic channel with said base station.

8. A method for controlling the synchronization of a DECT having a base station capable of registering a plurality of handset units, comprising the steps of:

(a) synchronizing said base station to a handset via a dummy channel;

(b) transmitting a new dummy bearer channel information from said base unit to a handset if a traffic channel is established between said base station and an additional handset;

(c) storing said new bearer channel information into a candidate buffer of said handset;

(d) determining whether said dummy channel and said traffic channel coexists more than a predetermined time period; and, (d)(i) if said dummy channel and said traffic channel coexists more than said predetermined time period, assigning a new dummy channel using said new dummy bearer channel information stored in said candidate buffer;

(d)(ii) if said dummy channel and said traffic channel coexist less than said predetermined time period, determining whether cyclic redundancy checking (CRC) errors of said dummy channel occurs more than a predefined number of times; and, assigning a new dummy channel using said new dummy bearer channel information stored in said candidate buffer if said CRC errors occur more than said predefined number of times.

9. The method as recited in claim 8, wherein said method further comprising the step of transmitting signal packet, which includes error detection information for detecting corrupt signals, as set forth under a digital European cordless telephone (DECT) standard.

10. The method as recited in claim 8, wherein said method further comprising the step of storing a plurality of different dummy channels in said base station, said different dummy channels are used to synchronize to said base station.

11. The method as recited in claim 8, wherein said CRC errors exceed said predefined number of times if said additional handset establishes said traffic channel with said base station.

12. The method as recited in claim 11, wherein said CRC errors do not exceed said predetermined times when said additional handset terminates said traffic channel in communication with said base station.

13. The method as recited in claim 8, wherein the step (b) of transmitting said dummy bear channel is repeated if said CRC error do not exceed said predetermined number of times.

14. The method as recited in claim 8, wherein said step (c) of storing said received bearer channel information is performed when said additional handset establishes said traffic channel with said base station.

15. The method as recited in claim 8, wherein said step (d)(i) of assigning said new dummy channel using said new dummy bearer channel information comprises the steps of:

deleting said dummy channel from said candidate buffer used to synchronize said handset to said base station in said step (a);

changing the receiving position of said handset unit to said candidate buffer where said new received bearer channel information is stored if said CRC errors exceeds said predefined number of times; and, retrieving, by said handset unit, said dummy bearer channel information stored in said candidate buffer in order to assign a new dummy channel to be used to synchronize to said base station.

* * * * *